US 9,353,785 B2

(12) United States Patent
Molinier

(10) Patent No.: US 9,353,785 B2
(45) Date of Patent: May 31, 2016

(54) ASSEMBLY OF TWO PARTS MADE OF COMPOSITE MATERIAL

(71) Applicant: AIRBUS OPERATIONS SAS, Toulouse (FR)

(72) Inventor: Bernard Molinier, Leguevin (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/012,418

(22) Filed: Aug. 28, 2013

(65) Prior Publication Data
US 2014/0064877 A1 Mar. 6, 2014

(30) Foreign Application Priority Data

Aug. 30, 2012 (FR) ..................... 12 58118

(51) Int. Cl.
| F16B 5/00 | (2006.01) |
| F16B 33/00 | (2006.01) |
| F16B 5/06 | (2006.01) |
| F16B 2/00 | (2006.01) |
| F16B 5/04 | (2006.01) |
| F16B 19/06 | (2006.01) |
| B29C 65/56 | (2006.01) |

(Continued)

(52) U.S. Cl.
CPC ............. *F16B 33/00* (2013.01); *B29C 65/562* (2013.01); *B29C 66/02245* (2013.01); *B29C 66/1122* (2013.01); *B29C 66/43* (2013.01); *B29C 66/721* (2013.01); *B29C 66/72141* (2013.01); *B29C 66/742* (2013.01); *F16B 2/005* (2013.01); *F16B 5/04* (2013.01); *F16B 5/06* (2013.01); *F16B 19/06* (2013.01); *B29C 66/02242* (2013.01); *B29C 66/1142* (2013.01); *B29C 66/7212* (2013.01); *B29C 66/73161* (2013.01); *B29L 2031/3082* (2013.01); *B29L 2031/3085* (2013.01); *B29L 2031/737* (2013.01)

(58) Field of Classification Search
CPC .. F16B 2005/0678; F16B 5/06; F16B 5/0635; F16B 5/6078; F16B 5/04; F16B 2/005
USPC .......................................................... 411/339
See application file for complete search history.

(56) References Cited

U.S. PATENT DOCUMENTS 3,726,178 A * 4/1973 Dimitry ..................... 411/371.1
6,281,148 B1 * 8/2001 Dagher et al. ............. 428/537.1

(Continued)

FOREIGN PATENT DOCUMENTS

DE 197 34 147 3/1999
DE 10 2010 024 534 12/2011

(Continued)

OTHER PUBLICATIONS

Preliminary European Search Report dated May 3, 2013.

*Primary Examiner* — Flemming Saether
(74) *Attorney, Agent, or Firm* — Dickinson Wright PLLC

(57) ABSTRACT

An assembly of parts, at least one of which is made of composite material, includes at least one fastener including a body and also two stops, between which the parts held by the fastener are disposed, holes formed in the parts held by the fastener, the body of the fastener being accommodated in the holes, the holes having a diameter adapted to that of the body of the fastener so as to allow transmission of forces by the parts and the fastener hammering together. The stops of the fastener exert a compressive force C that makes it possible to obtain transmission of forces by adhesion between the parts held by the fastener.

6 Claims, 2 Drawing Sheets

Figure 1:
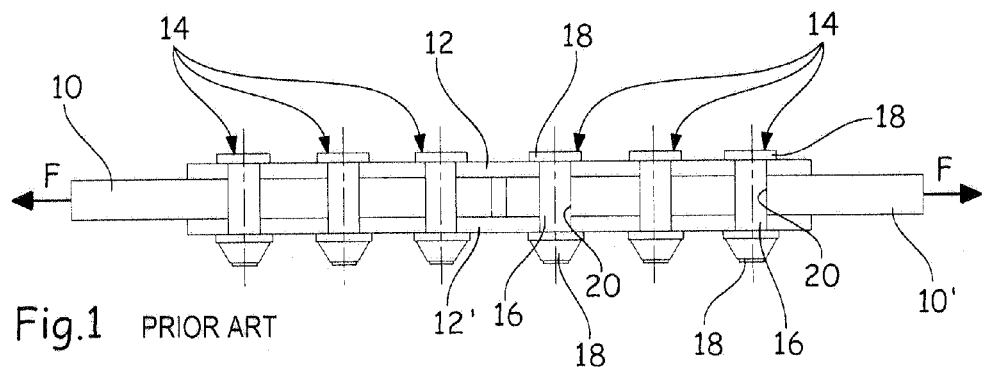

(51) Int. Cl.
  *B29C 65/00* (2006.01)
  *B29L 31/30* (2006.01)
  *B29L 31/00* (2006.01)

(56) References Cited

U.S. PATENT DOCUMENTS 7,351,022 B2 * 4/2008 Denslow ................ 411/501
8,181,327 B2 * 5/2012 Apfel ..................... 29/458

2004/0052581 A1   3/2004 Assler
2007/0086854 A1 * 4/2007 Blanton ................ 403/338
2011/0095129 A1 * 4/2011 Villares et al. ........ 244/119
2013/0340239 A1 * 12/2013 Ueda et al. ............ 411/501

FOREIGN PATENT DOCUMENTS

EP          1 393 835      3/2004
WO          2012/117737    9/2012

* cited by examiner

ASSEMBLY OF TWO PARTS MADE OF COMPOSITE MATERIAL

CROSS REFERENCE TO RELATED APPLICATIONS

This application is entitled to and claims the benefit of French Application No. 12 58118 filed Aug. 30, 2012, the disclosure of which, including the specification, claims, drawings and abstract, is incorporated herein by reference in its entirety.

The present invention relates to an assembly of two parts made of composite material.

According to one embodiment, a part made of composite material comprises fibres for example of carbon embedded in a resin matrix. The fibres are organized in the form of plies stacked on one another and are oriented in preferred directions depending on the stresses to which the part is subjected. Since the fibres are embedded in a resin matrix, the surfaces of the part are more or less smooth and have very low roughness.

In the case of plates made of composite material, the fibres are oriented in planes more or less parallel to the most extensive faces of the plate.

According to one embodiment, in order to assemble two plates 10 and 10' made of composite material which are disposed edge to edge, the latter are disposed between two splice plates 12, 12' straddling the two plates 10 and 10', and fasteners 14 oriented in a direction perpendicular to the plates are distributed in overlapping areas of the plates and the splice plates.

The splice plates are in the form of metal plates or plates made of composite material.

The fasteners 14 comprise a cylindrical body 16 having, at the ends, two stops 18 (head, nut or the like) that have a diameter greater than that of the body 16.

In order to make it possible to fit the fasteners 14, the plates and the splice plates comprise cylindrical holes 20 for each fastener, the holes and the plate and the splice plates being placed end-to-end and having the same diameter. In one procedure, the three parts, namely the plate and the two splice plates, are pierced with the same tool during a single piercing operation.

In order to ensure the transmission of forces from one plate to the other, in particular when tensile forces F are exerted on the two parts, said forces being oriented in opposite directions parallel to the plates, the body 16 of the fasteners 14 has a diameter adapted to that of the holes 20, the diameter of the body 16 being slightly less than that of the holes 20.

The stops of the fasteners do not exert a compressive force on the plates and the splice plates and simply hold them. Consequently, the stops have a diameter less than two times that of the body so as to reduce the on-board mass, which is a significant constraint in the aeronautical field.

According to the prior art, the fasteners 14 are subjected to shear stresses and the plates 10, 10' to hammering stresses distributed at least over part of the height of the holes and generally over the entire height.

This type of assembly has the drawback of resulting in local overloading of the fibres and of the resin in the region of the holes on account of the hammering, and this means that the thickness of the plate has to be increased in order to ensure better distribution of the forces over the surface of the holes in contact with the fasteners.

The present invention aims to remedy the drawbacks of the prior art by proposing an assembly of two parts made of composite material, making it possible to optimize the transmission of forces from one plate to the other.

To this end, the subject of the invention is an assembly of parts, at least one of which is made of composite material, said assembly comprising:

at least one fastener comprising a body and also two stops, between which the parts held by the fastener are disposed, holes formed in the parts held by the fastener, the body of the fastener being accommodated in said holes, said holes having a diameter adapted to that of the body of the fastener so as to allow transmission of forces by the parts and the fastener hammering together, characterized in that the stops of the fastener exert a compressive force C that makes it possible to obtain transmission of forces by adhesion between the parts held by the fastener.

By virtue of this type of assembly, the transmission of forces between the assembled parts is ensured by the hammering forces and the adhesion forces.

At equal forces transmitted between the assembled parts, the invention makes it possible to reduce those transmitted by hammering, thereby making it possible to limit local overloading in the region of the fibres and the resin. As a result, at equal stresses, the thickness of the assembled parts in the region of the assembly zone can be reduced.

At equal hammering stresses, the assembly according to the invention makes it possible to increase the forces transmitted between the two assembled parts.

BRIEF DESCRIPTIONS OF DRAWINGS

Figure 2:
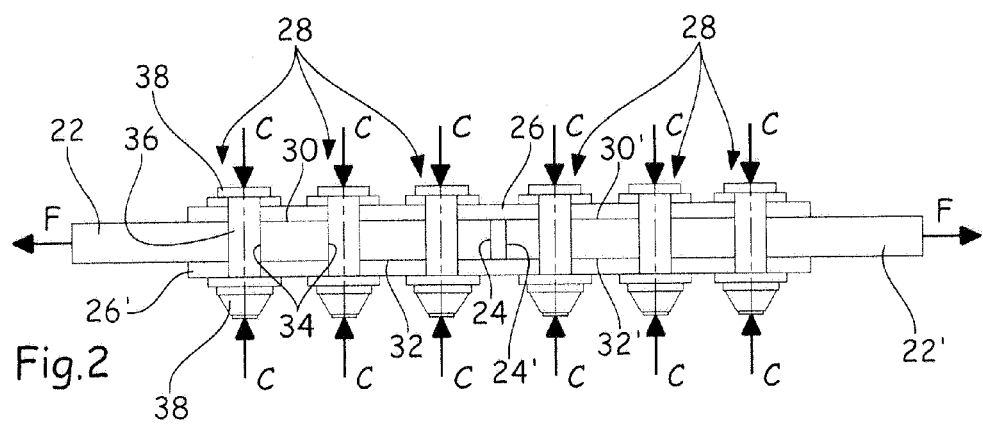
Figure 3:
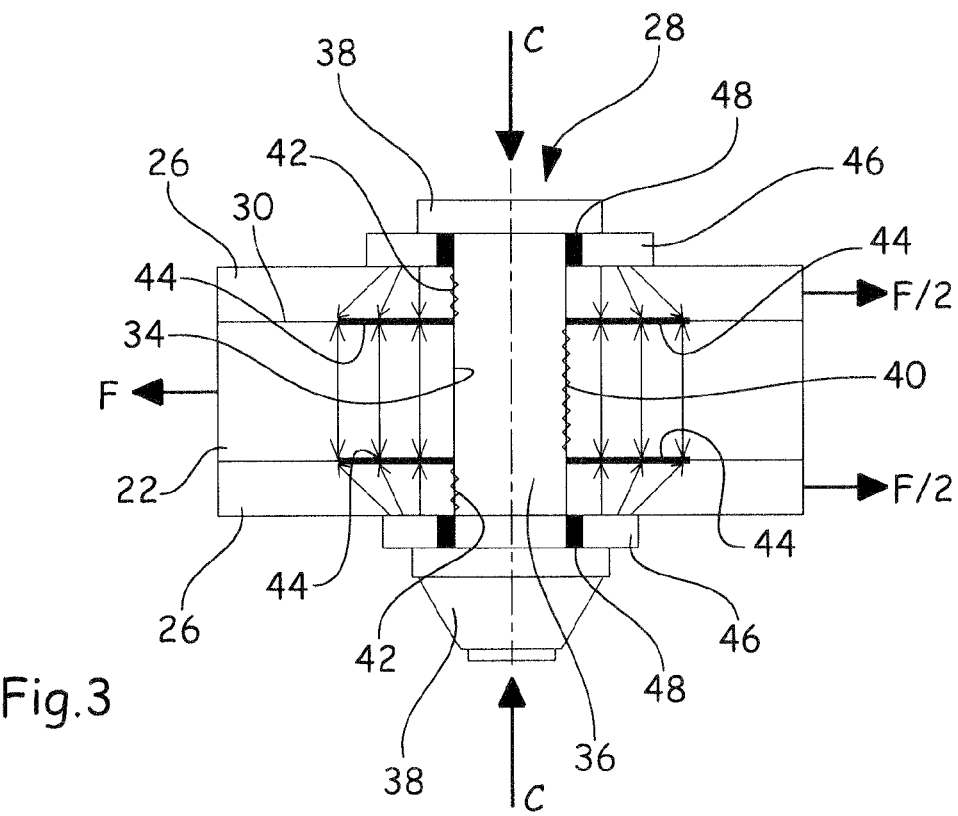
Figure 4:
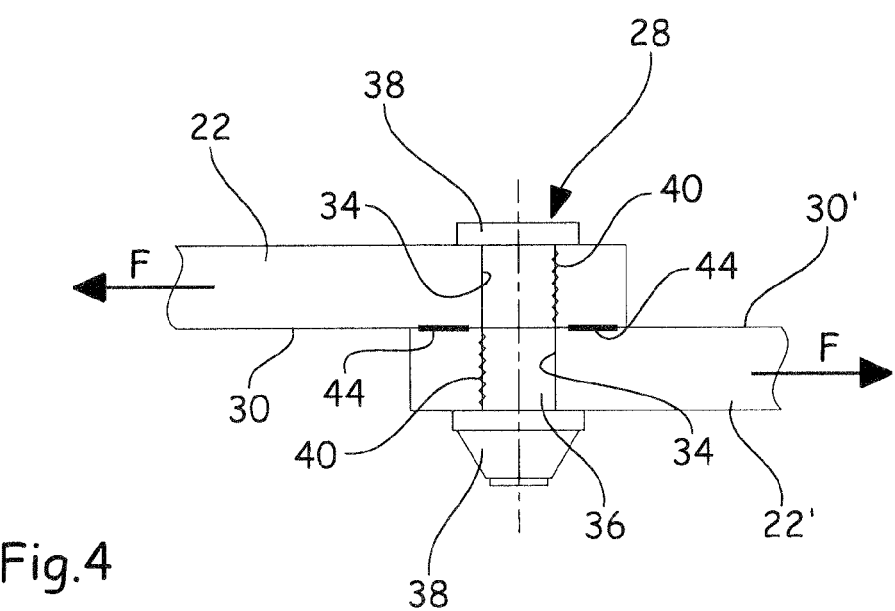

Further features and advantages will become apparent from the following description of the invention, this description being given only by way of example, with reference to the appended drawings, in which:

FIG. 1 is a cross section through an assembly of two parts made of composite material according to the prior art, FIG. 2 is a cross section through an assembly of two parts made of composite material according to one variant of the invention, FIG. 3 is a detail from FIG. 2, illustrating the transmission of forces between a fastener and a part, and FIG. 4 is a cross section through an assembly of two parts made of composite material according to another variant of the invention.

DETAILED DESCRIPTION

FIG. 2 shows two parts 22 and 22' made of composite material. These two parts 22 and 22' comprise adjacent edges 24 and 24' and are assembled by virtue of at least one intermediate part 26, known as a splice plate in the following text, straddling the two parts to be assembled and fasteners 28 disposed in the overlapping areas of the splice plates 26 and the assembled parts 22 and 22'. According to a preferred embodiment, the assembled parts 22 and 22' each comprise a substantially planar contact surface 30, 30', against which the splice plate 26, which is in the form of a plate and may be metallic or made of composite material, can press. Advantageously, as illustrated in FIG. 2, the assembly comprises two splice plates 26 and 26', between which the assembled parts 22 and 22' are disposed.

In the region of areas of contact with the splice plate or splice plates 26 (and 26'), the assembled parts comprise two substantially planar, mutually parallel contact surfaces 30 (and 30') and 32 (and 32'). Advantageously, the contact surfaces 30 and 30' (and 32 and 32', respectively) of the assembled parts 22 and 22' are coplanar.

Hereinbelow, a reference plane is understood to mean a plane parallel to the planes of the contact surfaces 30 and 30'.

According to another simplified variant, illustrated in FIG. 4, the parts 22, 22' are assembled without a splice plate. The two parts 22, 22' comprise contact surfaces 30, 30' which are pressed against one another and at least one of the parts is made of composite material.

According to one embodiment, the assembled parts 22 and 22' comprise fibres organized in the form of plies and are oriented in one or more directions parallel to the reference plane.

In order to allow the passage of the fasteners, the parts 22 and 22' and the splice plate or splice plates, if they are present, comprise holes 34, for each fastener, disposed in line with one another. According to one embodiment, for one and the same fastener, these holes are cylindrical and coaxial and have axes which are approximately perpendicular to the reference plane.

In parallel, each fastener 28 comprises a body 36, which is preferably cylindrical and has an axis approximately perpendicular to the reference plane and coaxial with the axis of the corresponding hole 34, and stops 38, the cross-sectional area of which is greater than that of the body 36.

According to one embodiment, the fastener 28 is in the form of a bolt, the screw head forming a first stop and the nut a second stop.

According to an important point, for a given fastener 28, the hole 34 in which it is accommodated has a diameter adapted to that of the fastener so as to allow transmission of forces by the part and the fastener hammering together. The term "adapted" is understood to mean that the diameter of the hole 34 is slightly smaller or greater, by a few hundredths or tenths of a millimeter, than that of the holes 20.

Thus, as illustrated in FIG. 3, when a tensile force F which tends to space apart the two assembled parts 22, 22' is applied in the region of a fastener 28, the splice plates 26 each exert a force F/2 in a first direction on the fastener 28, while the part 28 exerts a force F on the fastener. In the case of an assembly without a splice plate, the two parts 22 and 22' each exert a force F in the region of a fastener.

The fastener 28 is subjected to shear stresses. In parallel, in the area of contact between the fastener 28 and the part 22, the latter is subjected to hammering stresses which are shown schematically and have the reference 40 in FIG. 3. In the same way, in the area of contact between the fastener 28 and each splice plate 26, the latter is subjected to hammering stresses which are shown schematically and have the reference 42 in FIG. 3.

According to one feature of the invention, for at least one fastener that ensures transmission of forces by hammering, the stops 38 of said fastener exert a compressive force C that makes it possible to obtain transmission of forces by adhesion between the parts held by the fastener, specifically either between the parts 22 and 22' or between the part 22 and the splice plate or splice plates 26, depending on the type of assembly. The areas of transmission of forces by adhesion are shown schematically and have the reference 44 in FIG. 3. According to the invention, the transmission of forces between the assembled parts 22 and 22' is ensured not only by hammering forces but also by adhesion forces. As a result, at equal forces transmitted between the assembled parts, the invention makes it possible to reduce those transmitted by hammering, thereby making it possible to limit local overloading in the region of the fibres and the resin. As a result, at equal stresses, the thickness of the assembled parts in the region of the assembly zone can be reduced.

Alternatively, at equal hammering stresses, the assembly according to the invention makes it possible to increase the forces transmitted between the two assembled parts.

Advantageously, the assembly comprises means for increasing the adhesion between the parts or between the parts and the splice plates. Thus, it is possible to reduce the compressive force C at equal transmitted forces.

Preferably, at least the areas of surfaces that ensure the transmission of forces by adhesion have increased roughness which will be defined by tests.

According to one embodiment, the entire contact surface 30 has increased roughness. As a variant, only the perimeter of the holes 34 has increased roughness.

The increased roughness of a metal part can be obtained by knurling or roller burnishing.

In the case of a part made of composite material, in the area of the contact surface 30, 30', 32 and 32', at least the last layer of the part delimiting the contact surface is in the form of a fibre fabric. In parallel, the quantity of resin at the surface is reduced. In this case, the resin makes it possible to ensure the cohesion between the different layers, but does not completely fill the gaps between the fibres of the fabrics provided at the surface, so as to form irregularities.

As a variant, the roughness obtained by the preparation of the surface (knurling or roller burnishing) in the case of a metal part or by the fabrics in the case of a part made of composite material can be replaced by a removable adhesive or by gripping paste or by mastic of the special PR type. Thus, an intermediate layer can be provided between the two parts in order to enhance the adhesion.

Advantageously, for a given fastener, the surface at which the fastener exerts a compressive force is enlarged and has a cross-sectional area greater than three times that of the body of the fastener. Preferably, for a given fastener, the area of the contact surface that ensures the transmission of forces by adhesion has a cross-sectional area greater than or equal to that of the surface at which the fastener exerts a force. This configuration makes it possible to distribute the compressive forces and to increase the transmission of forces by adhesion.

According to a first variant, illustrated in FIG. 4, at least one of the stops 38 of the fastener has a cross-sectional area three times greater than that of the body of the fastener.

According to another variant illustrated in FIGS. 2 and 3, in the region of at least one stop 38, a washer 48 is introduced between the stop 38 and the part 22 or the splice plate 26, 26'. This washer has an inside diameter that allows the body of the fastener to pass through and an outside diameter greater than three times the diameter of the body of the fastener.

The washer 46 may be metallic.

Preferably, a washer 46 is provided in the region of each stop 38 of the fastener. As illustrated in FIG. 3, the washer 46 preferably has an inside diameter that makes it possible to accommodate an annular seal 48 between the body of the fastener and the washer 46. This configuration makes it possible to improve the sealing of the assembly. Advantageously, a coating covers all of the elements so as to enhance the sealing.

The assembly of the invention is intended more particularly for the aeronautical field and more specifically for all of the junctions that allow the use of fasteners having protruding heads, such as the junction between the wing structure and the fuselage under the fairing.

Of course, the invention is not limited to fasteners having protruding heads. Thus, fasteners having special countersunk heads may be suitable.

Similarly, the invention may be suitable when the assembly is subjected to tensile forces F as illustrated in the figures but also when the assembly is subjected to compressive forces.

The invention claimed is:

1. An assembly comprising:
a plurality of parts having holes formed therein and at least one of which is made of composite material, a first part of said parts and a second part of said parts having adjacent longitudinal edges forming a gap therebetween, said first and second parts being assembled by virtue of a third part of said parts, said third part straddling the gap between the first and second parts; and
a plurality of fasteners each comprising (i) a body, accommodated in one or more of said holes, and (ii) two stops, the plurality of parts being held by the fasteners between said stops, said holes having a diameter adapted to that of the body of the fasteners so as to allow transmission of hammering forces by the plurality of parts and the fasteners impacting one another,
wherein the stops of the fasteners exert a compressive force C on the plurality of parts held therebetween to enable transmission of increased adhesion forces by adhesion between the plurality of parts held by the fasteners,
wherein said increased adhesion forces cause a decrease in said hammering forces,
wherein the plurality of parts held by the fasteners include surfaces of increased roughness structured to provide transmission of the adhesion forces between the plurality of parts when the plurality of parts contact one another at said surfaces, the surfaces of increased roughness having increased roughness relative to another surface of said parts held by the fasteners, and
wherein the at least one part made of composite material comprises, at least in the region of areas of the surfaces of increased roughness structured to provide the transmission of the adhesion forces, at least a last layer in the form of a fibre fabric, a quantity of resin at a surface of the last layer being reduced relative to another portion of said last layer.

2. The assembly according to claim 1, further comprising an intermediate layer between the plurality of parts held by the fasteners for reinforcing the adhesion forces between the plurality of parts.

3. The assembly according to claim 1, characterized in that the fasteners have an enlarged surface that exerts said compressive force on the plurality of parts, the enlarged surface having a cross-sectional area greater than three times that of the body of the fasteners.

4. The assembly according to claim 3, characterized in that the area of the surfaces structured to provide transmission of the adhesion forces between the plurality of parts is greater than or equal to that of the enlarged surface at which the fasteners exert said compressive force.

5. The assembly according to claim 3, characterized in that it comprises, in a region of at least one of the stops of the fasteners, a washer having an outside diameter greater than three times a diameter of the body of the fasteners.

6. The assembly according to claim 5, characterized in that the washer has an inside diameter structured to accommodate an annular seal between the body of the corresponding one of the fasteners and the washer.

* * * * *